United States Patent [19]

Ginn

[11] Patent Number: 4,909,560

[45] Date of Patent: Mar. 20, 1990

[54] DIGITAL LINEAR POSITION SENSOR

[75] Inventor: Mark E. Ginn, Royal Oak, Mich.

[73] Assignee: Hoover Universal, Inc., Ann Arbor, Mich.

[21] Appl. No.: 316,783

[22] Filed: Feb. 27, 1989

[51] Int. Cl.⁴ .............................................. B60N 1/02
[52] U.S. Cl. .................................. 296/65.1; 248/429; 297/344; 324/207.20; 338/32 R
[58] Field of Search ...................... 296/65.1; 297/344; 248/429; 338/32 R, 32 H; 324/207, 208, 251, 252, 226

[56] References Cited

U.S. PATENT DOCUMENTS

| | | | |
|---|---|---|---|
| 2,927,627 | 3/1960 | Lohr | 248/429 |
| 2,982,335 | 5/1961 | Garvey | 248/424 |
| 2,983,545 | 5/1961 | Garvey et al. | 296/65.1 |
| 3,059,960 | 10/1962 | Komorowski | 296/65.1 |
| 3,183,314 | 5/1965 | Pickles | 248/394 |
| 4,204,255 | 5/1980 | Cremer | 296/65.1 |

Primary Examiner—Robert R. Song
Attorney, Agent, or Firm—Harness, Dickey & Pierce

[57] ABSTRACT

The present invention is a simple digital vehicle seat position sensor which comprises a magnetic field sensor such as a Hall integrated circuit and a strip of magnetic poles of alternating polarity which are moved relative to one another as the vehicle seat position is changed to produce a square wave pulse which is counted as a control module.

7 Claims, 2 Drawing Sheets

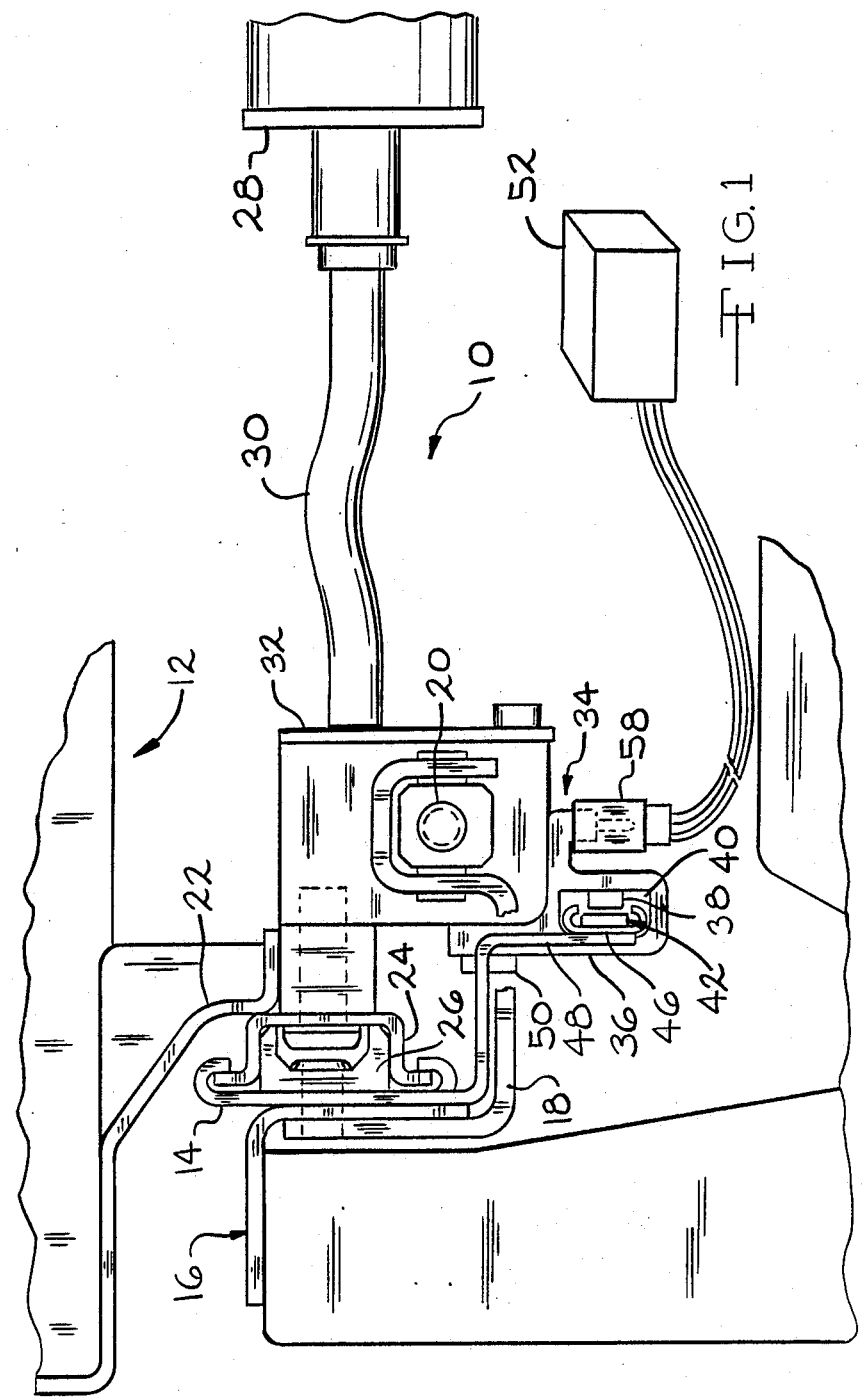

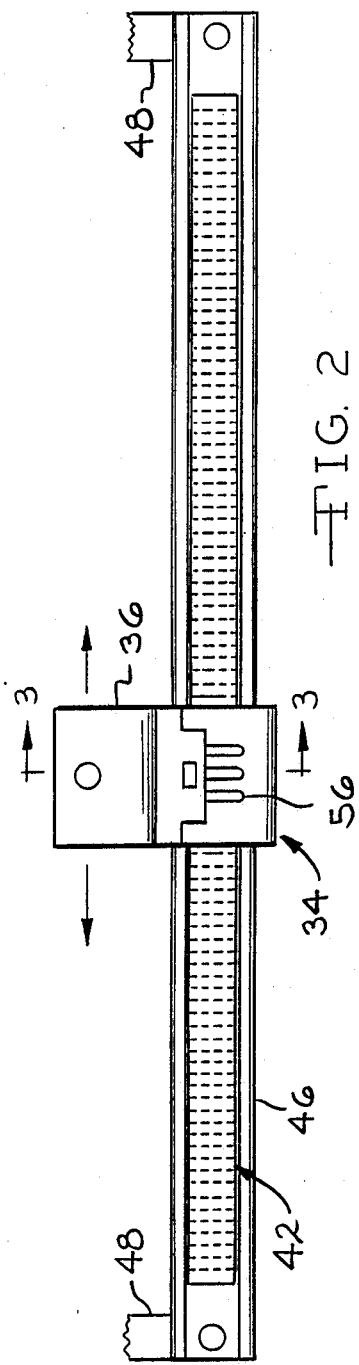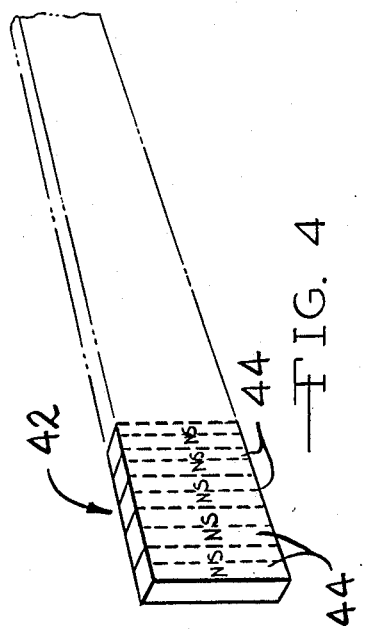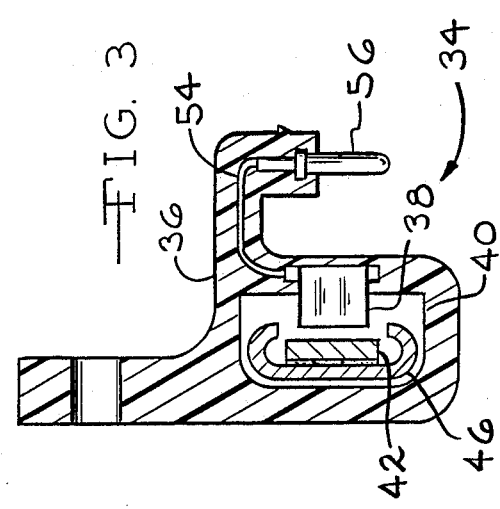

DIGITAL LINEAR POSITION SENSOR

BACKGROUND AND SUMMARY OF THE INVENTION

This invention relates to vehicle seat adjustment mechanisms and more particularly to a sensing device for sensing the position of a vehicle seat along a track.

Automobiles are normally designed with both front and rear seats. The front seat usually must be moved forward and the seat back tilted forward to provide access to the rear seating area in two door vehicle designs. It is well known in the art to provide vehicle seats which are manually adjustable forward and backward to suit the convenience of the occupant. Various powered mechanical mechanisms have also been designed to perform these adjustments. These power seat adjusters include a motor drive unit which can manually be energized in a forward or reverse direction to move the vehicle seat forward or backward.

A variety of mechanisms have been designed to also act as memory devices used in returning the vehicle seat to the original adjusted position in powered seat adjustment mechanisms. Examples of such mechanisms are disclosed in U.S. Pat. Nos. 3,183,314, 4,304,386, 3,250,566 and 4,283,036. These patents teach mechanical mechanisms utilizing program wheels, cams and limit switches.

All of these mechanisms are relatively complex arrangements of switches, cams, linkages and springs which may be prone to failure. In addition, difficulties with power seat systems which use mechanical indication devices to provide a "memory" of seat position, are related to gear backlash, drive cable windup and release, and speed variations which can all play a part in limiting the accuracy of positioning as well as the repeatability of the mechanism. Accordingly, there is a need for a simple and inexpensive mechanism to provide accurate relative position information for a motorized or powered seat adjustment mechanism.

It is therefore an object of the present invention to provide a simple, inexpensive position sensing device that essentially uses only two basic components, a magnetic strip and a magnetic field sensor. It is another object of the present invention to provide a vehicle position sensing device which eliminates the sensitivity to mechanical uncertainties discussed above with respect to mechanical linkage assemblies.

The digital position sensor according to the present invention includes a Hall effect integrated circuit which, when passed through a changing magnetic field, causes its output transistor to turn on or turn off depending on the transitional direction of the changing magnetic field. The changing field is provided by a strip of small alternating magnetic poles which moves relative to the face of the Hall sensor. The relative motion between the magnetic strip and the Hall sensor may either be produced by moving the Hall sensor or moving the magnetic strip.

In one preferred embodiment, the magnetic strip is held stationary alongside the seat track upon which the vehicle seat assembly slides, and the Hall integrated circuit is maintained in a fixed position with respect to the vehicle seat assembly itself. As the vehicle seat is moved forward or backward along the track, the sensor is in turn moved along the face of the magnetic strip. As the Hall integrated circuit passes changing poles, a square wave current pulse is produced which is in turn fed to a control module which digitally counts the pulses and hence provides a direct indication of relative vehicle seat position.

Other objects, features and advantages of the present invention will become more apparent to those skilled in the art as the nature of the invention is better understood from the accompanying drawing and the following detailed description as well as the accompanying claims.

BRIEF DESCRIPTION OF THE DRAWINGS

FIG. 1 is a fragmentary front view of a motorized vehicle seat position adjustment mechanism illustrating a preferred arrangement of the digital linear position sensor in accordance with the present invention;

FIG. 2 is a fragmentary side view of the linear position sensor illustrated in FIG. 1;

FIG. 3 is a sectional view of the sensor taken along the lines 3—3 in FIG. 2; and FIG. 4 is a schematic representation of the magnet strip shown in FIGS. 1 through 3.

DETAILED DESCRIPTION OF THE INVENTION

Turning now to the drawing, a vehicle seat power adjustment mechanism 10 is illustrated in a partial front elevational view in FIG. 1. The adjustment mechanism 10 drives a vehicle seat assembly 12 forward and backward along a stationary C-shaped channel track 14. Track 14 is in turn mounted to a stationary seat support 16 fixed to the floor of the vehicle body. Also, mounted to stationary seat support 16 is a lead screw support bracket 18. In FIG. 1, only the front lead screw support bracket 18 is illustrated. An identical bracket is positioned behind the adjustment mechanism 10 and serves to mount the lead screw 20.

Bolted to seat assembly 12 is a seat frame bracket 22 which is in turn bolted or otherwise fixed to a slide 24 which slides back and forth in stationary track 14 and is held in position therein by slide blocks 26. Although not shown, another identical slide 24 and stationary C-shaped track 14 is positioned on the opposite side of the seat assembly so that the seat assembly 12 is supported for movement in forward and reverse directions in the pair of parallel stationary seat tracks 14.

The adjustment mechanism 10 includes a drive motor 28 connected through a flexible drive 30 to a gear box 32 bolted to slide 24 which translates the rotary motion of the drive motor 28 to linear foward and back motion along lead screw 20 to in turn move the bracket 22 and the slide 24 and thus the seat assembly 12 forward and backward.

Mounted to gear box 32 and suspended therefrom is a linear position sensor assembly 34 in accordance with the present invention. Position sensor assembly 34 rides forward and backward along with gear box 32 and seat assembly 12.

Position sensor assembly 34 comprises a plastic housing 36 best shown in section in FIG. 3. Housing 36 supports a Hall effect integrated circuit 38 as the position sensor. Hall integrated circuit 38 is mounted in housing 36 so as to face into a generally D-shaped passage 40 through housing 36.

Positioned adjacent the Hall effect integrated circuit 38, within passage 40, is a stationary plastic strip 42 having embedded in it a series of magnet poles 44 of alternating polarity. Magnetic strip 42 is essentially a piece of plastic tape which is supported by a strip carrier 46 which is a plastic channel mounted at either end to a mounting bracket 48 which is in turn supported by track 14. Mounting bracket 48 is preferably an extension downward of the ends of stationary seat track 14 as shown in FIG. 1.

Linear position sensor assembly 34 may be mounted on a nub 50 projecting from the drive pinion gear of box 32. Alternatively, the sensor assembly 34 may be bolted or otherwise fixed to the gear box 32 so as to move with the gear box and seat assembly 12 as drive motor 28 moves seat assembly 12 forward and backward.

As shown in FIGS. 1 and 3, the Hall integrated circuit 38 is positioned close to the magnetic strip so that as the position sensor simply moves along with gear box 32, the Hall integrated circuit 38 passes in front on the magnet strip 42.

As shown in FIG. 4, the magnet strip 42 is basically a plastic tape having a series of magnets embedded therein with alternating polarities adjacent one another and facing the Hall integrated circuit 38. Therefore, as the gear box is moved backward and forward, the Hall integrated circuit 38 passes in close proximity to each of the poles 44 in the magnetic strip 42.

The Hall effect integrated circuit basically switches its output transistor off and on as the integrated circuit 38 passes the alternating north and south poles 44 in the magnetic strip 42. This provides a square wave output that can be counted by a control module 52 to provide data on the position of the vehicle seat assembly 12. Lead wires 54 direct the output of circuit 38 to male terminals 56 which are in turn connected to a female connector 58 for transmission of the sensor output to the control module 52 which is remotely positioned as a design convenience.

As the control module 52 merely counts polarity reversals, position accurancy depends upon the number of poles. An optimum number of eleven poles per inch may be used to accurately position the vehicle seat.

Other physical arrangements of the magnetic strip 42 and Hall effect circuit 38 can be made. The magnetic strip 42 could be cut into a crescent shape and bonded to the sector gears on a seat track recliner to provide position feedback for the front and rear tilt axis on a power seat. Thus, the magnetic strip and Hall integrated circuit could be utilized to determine rotational position as well as linear position as shown in the drawing.

Alternatively, in the linear position sensor assembly above described, the positioning of the Hall integrated circuit 38 and the magnetic strip 42 could be interchanged. In other words, the Hall integrated circuit 38 could be stationary and the magnetic strip 42 fixed to the moving seat assembly so that the magnetic strip moves pass the stationary integrated circuit.

Other changes may be made in the combination and arrangement of parts and elements as above set forth and as shown in the drawings without departing from the spirit and scope of the invention as defined by the following claims.

What is claimed is:

1. In an automotive vehicle having a seat for an occupant mounted on a stationary seat frame and a motorized seat position adjustment mechanism for moving a portion of said seat, an apparqatus for digitally sensing and storing the position of said portion of said seat comprising:
   a stationary member;
   a movable member fixed to said portion of said seat and being movable relative to said stationary member;
   a plurality of magnets mounted on one of said members, said magnets having alternating magnetic poles arranged in a side by side manner on said one member; and
   a sensing means positioned on the other of said members in close proximity and alignment with said poles on said one member whereby said sensing means produces a signal when one of said poles passes said sensing means as said mechanism adjusts the position of said seat.

2. The apparatus according to claim 1 wherein said sensing means is a Hall effect integrated circuit which produces an electrical current pulse when one of said poles passes said circuit.

3. The apparatus according to claim 1 wherein said plurality of magnetic poles are arranged in a row on a straight strip of material when is secured to one of said members for sensing linear movement of said portion of said movable seat.

4. The apparatus according to claim 3 wherein said strip is a plastic material having said magnetic poles therein.

5. The apparatus according to claim 2 further comprising:
   a control module means for digitally counting and storing the number of said pulses produced by said circuit and for controlling said adjustment mechanism and conduit means for routing said pulses from said circuit to said control module means whereby as said adjustment mechanism moves said portion of said seat, said movable member moves relative to said stationary member causing said alternating magnetic poles to induce electrical current pulses in said circuit as said poles pass said circuit, said pulses being counted and stored by said control module means so as to memorize the position of said portion of said seat.

6. The apparatus according to claim 5 wherein said plurality of magnets are arranged in a row on a straight strip of material which is secured to one of said members for sensing linear movement of said portion of said movable seat.

7. The apparatus according to claim 7 wherein said strip of material is an elongated plastic channel having a pair of ends fixed to said stationary frame, said magnets being arranged side by side in a row in said channel, said movable member comprising a plastic housing having a passage therethrough for passage of said channel therein, said circuit being mounted in said housing adjacent said passage so that said circuit and said magnets are maintained in close proximity with one another as said portion of said seat is moved.

* * * * *